United States Patent [19]
Kingstone et al.

[11] Patent Number: 5,528,714
[45] Date of Patent: Jun. 18, 1996

[54] FIBER OPTICS LIGHT SOURCE WITH ADJUSTABLE MOUNTING, REPLACEABLE COLOR WHEEL ELEMENTS AND COOLING

[75] Inventors: Brett M. Kingstone, Orlando, Fla.; William Collins, Longmont, Colo.; Stephen M. Faber, Orlando; Pinhas Koren, Altamonte, both of Fla.

[73] Assignee: Super Vision International, Inc., Orlando, Fla.

[21] Appl. No.: 311,129

[22] Filed: Sep. 23, 1994

[51] Int. Cl.$^6$ ..................................... G02B 6/44
[52] U.S. Cl. ........................ 385/100; 385/147; 362/32
[58] Field of Search ................... 385/100, 147, 385/900, 901, 31; 362/32, 806, 293, 364, 294

[56] References Cited

U.S. PATENT DOCUMENTS

| | | | |
|---|---|---|---|
| 4,519,017 | 5/1985 | Daniel | 362/32 |
| 4,704,660 | 11/1987 | Robbins | 362/32 |
| 4,715,700 | 12/1987 | Daniel | 385/31 |
| 4,825,341 | 4/1989 | Awai | 362/32 |
| 4,922,385 | 5/1990 | Awai | 362/32 |
| 5,016,152 | 5/1991 | Awai et al. | 362/32 |
| 5,021,928 | 6/1991 | Daniel | 385/31 X |
| 5,183,323 | 2/1993 | Daniel | 362/32 |

*Primary Examiner*—Akm E. Ullah
*Attorney, Agent, or Firm*—James H. Beusse; Warren L. Franz

[57] ABSTRACT

A light source for illuminating a fiber optic cable comprising a housing having an internal cavity and an aperture communicating said cavity externally of said housing, an optical system located within said internal cavity; said optical system comprising a reflector and a high intensity lamp positioned within said reflector for directing light along an optical axis, a plate of heat absorbing material spaced from said reflector, and at least one color filter spaced from said plate and said reflector.

15 Claims, 7 Drawing Sheets

FIBER OPTICS LIGHT SOURCE WITH ADJUSTABLE MOUNTING, REPLACEABLE COLOR WHEEL ELEMENTS AND COOLING

This invention relates to fiber optic lighting, in general; and, in particular, to light source apparatus and methods for illumination of fiber optic cable.

BACKGROUND OF THE INVENTION

Fiber optic cable finds many applications. In addition to transmitting light in a longitudinal mode, such cable also transmits light laterally. For data communications, an effort is made to minimize such lateral transmission; however, for decorative accent lighting and displays, lateral transmission is encouraged in order to provide uniform sideways lighting or "glow" over the length of the cable. An example of a fiber optic cable which enhances lateral illumination is given in Kingstone U.S. Pat. No. 5,333,228, the disclosure of which is incorporated herein by reference.

Lateral emissions from fiber optic cable are useful for area lighting and spotlighting, such as around swimming pools, walkways, signs, and for other safety and decorative accent lighting applications. In a typical such lateral emission application, one or more lengths of cable are positioned around an area or structure to be illuminated or accented, and coupled at one or both ends to receive light from a light source. Installations are frequently outdoors, involving exposure to the elements. The light source usually comprises a housing enclosing a high intensity, gas discharge lamp having an integral or separate reflector adapted to concentrate light from the lamp onto the ends of the cable fibers, and ferrule or bushing means for fixing the position of the cable relative to the lamp. A color wheel or similar movable color filter mechanism may be interposed between the lamp and the cable, for control of color of the emitted light.

Such devices suffer from certain drawbacks. The contained high intensity, gas discharge lamp is a major source of heat which must be dissipated. The problem is especially acute because reflectors of conventional light sources (see, for example, the truncated ellipsoid reflector arrangement in Awai et al. U.S. Pat. No. 5,016,152) direct the light to a focal point coincident with the ends of the fibers. Concentrating the light (and, thus, the heat) at the entrance of the fibers can distort or melt the fibers. Attempts to avoid this problem include the use of integral face plates and dichroic filtering on the reflector. To remove heat from the housing, traditional approaches include the use of fans and heat vents for circulating air (see, e.g., Awai U.S. Pat. No. 4,922,385). Unshielded and fixed vent openings, however, admit rain, backsplash, ice and snow, thereby severely curtailing available outdoor housing placement opportunities.

Traditional lamp arrangements fix the bulb to the reflector either integrally at the time of manufacture, or by epoxy or similar permanent affixation means at the time of initial assembly. Where positioning of the filament relative to a focus (viz. proximal focal point of an ellipsoid reflector) is performed, separate bench alignment apparatus is employed prior to fixation. Subsequent in-field fine adjustment or readjustment is, therefore, rendered difficult. Fixing of the cable relative to the housing is conventionally accomplished using ferrules whose designs involve use of multiple screws, dowels and brackets to mount the cable tightly to the ferrule, making on-site installation awkward, tedious and time-consuming.

Known color management schemes employ pluralities of dichroic glass filters mounted on a movable platform for selective insertion between the lamp and the cable fiber ends. The usual arrangement employs a color wheel under stepper motor control, an example of which is shown in Hwang U.S. Pat. No. 5,184,253. Epoxy or similar means is used to permanently mount the filters perimetrically over apertures in the color wheel. Alternatively, the filters may be removably clamped between opposing framing elements joined by screws or other removable fasteners. Filter exchange and/or replacement is, thus, prevented or, at least, rendered difficult.

SUMMARY OF THE INVENTION

It is an object of the present invention to provide improved light source apparatus and methods for illumination of fiber optic cable; especially, fiber optic cable utilized in lateral emission applications.

It is a further object of the present invention to provide fiber optic cable illumination apparatus and methods exhibiting improved coupling between a lamp and the ends of cable fibers.

It is a further object of the invention to provide such apparatus and methods enabling ready mounting of a cable to a light source housing, and ready relative positional adjustment and readjustment between a lamp and a cable.

It is a further object of the invention to provide such apparatus and methods for improved air cooling of a housing, thereby expanding opportunities for outdoor installation.

It is yet another object of the invention to provide such apparatus and methods employing an improved color management scheme, enabling rapid and convenient exchange and replacement of color filters.

These and other objects, features and advantages of the invention are provided by improved light source apparatus and methods, preferred embodiments of which are described in greater detail below. The light source has a housing enclosing a high intensity lamp, cooperative with an ellipsoid reflector to direct light from the lamp to ends of fibers of a fiber optic cable. In accordance with one aspect of the invention, coupling between the lamp and cable ends is effected so that the lamp bulb filament is located at a proximal focus of the reflector and the fiber ends are located toward the bulb, spaced beyond a distal focus of the reflector. This places the bundle of fiber ends in a defocused zone, dividing the entrance light more evenly over the fibers and avoiding intense concentration of focused light at the air/fiber entrance interface. One described embodiment, provides a platform included within the housing that enables ready adjustability in three degrees of freedom of the positional relationships of the bulb and reflection active surface. The housing advantageously has a two-piece molded hinged clamshell design, with an air-cooled system having louvers that can be selectively rotated 90° to vary direction of shielding given to underlying vent channels.

In accordance with another aspect of the invention, mounting connection between the cable and housing is established utilizing a simple ferrule structure, which employs a compressible collar and parts that thread together about the collar to capture cable fibers within the ferrule. Color management is accomplished using a color wheel rotated by a stepper motor, and including apertures provided with marginal tabs for perimetrically releasably retaining color filters therein.

BRIEF DESCRIPTION OF THE DRAWINGS

Embodiments of the invention have been chosen for purposes of illustration and description, and are shown with reference to the accompanying drawings, wherein.

Throughout the drawings, like elements are referred to by like numerals.

DETAILED DESCRIPTION OF PREFERRED EMBODIMENTS

Figure 1:
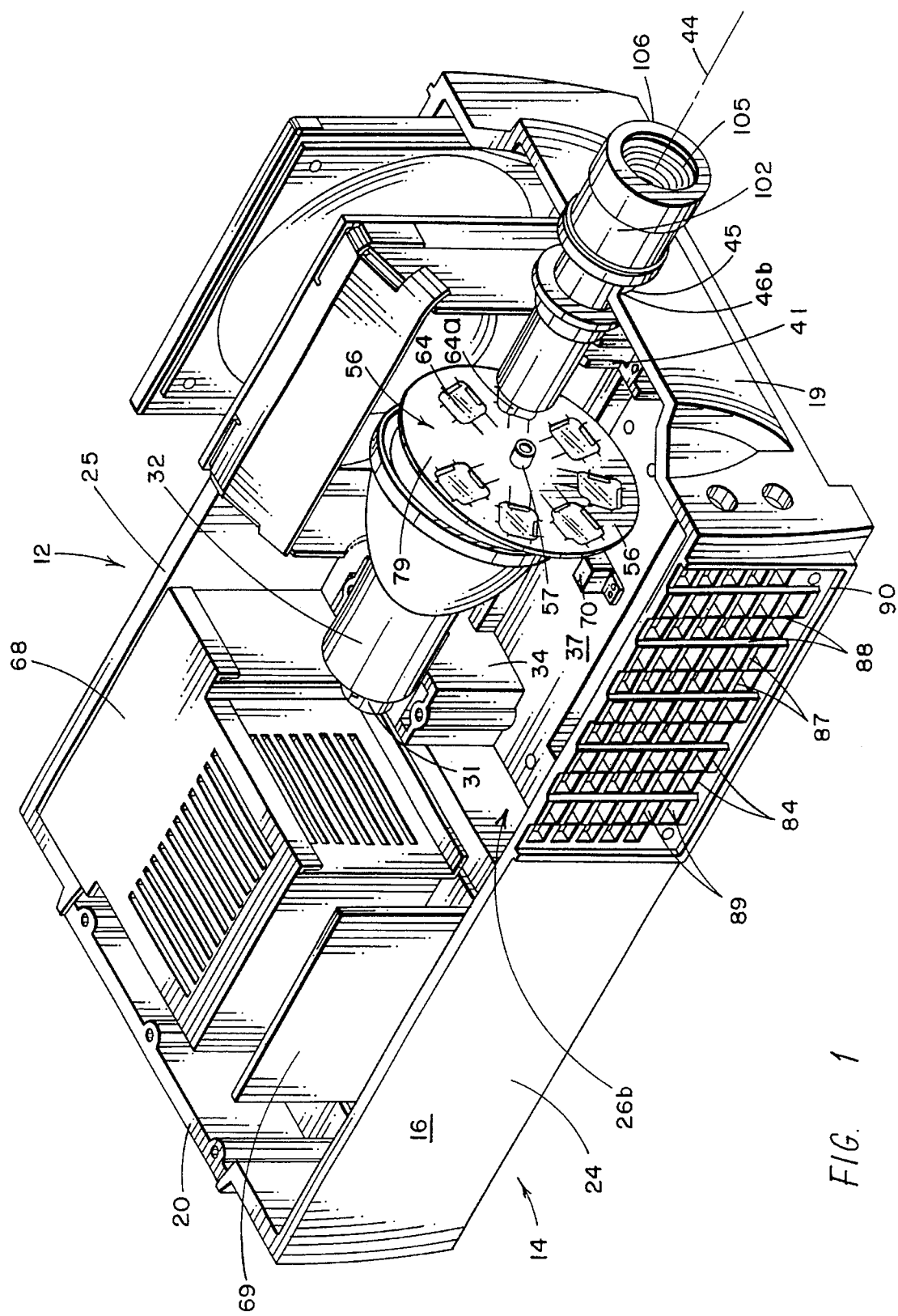
FIG. 1 is a perspective view, with portions removed, of a light source apparatus in accordance with the invention, usable in practicing a method in accordance with the invention.

A fiber optics light source 12 has a housing 14 including top and bottom halves 15, 16 (FIGS. 1 and 3), joined in clamshell fashion about a hinge 17. Each half 15, 16 has an open box-like construction with longitudinally spaced, laterally extending front and rear walls 19, 20 directed upwardly from corresponding front and rear edges of a rectangular base 22, and with laterally spaced, longitudinally extending side walls 24, 25 directed upwardly from corresponding side edges of base 22 and joining walls 19, 20 at corners. Facing surfaces of base 22 and walls 19, 20, 24, 25 of housing halves 15, 16 define respective upper and lower hollow portions 26a, 26b which combine to form an internal cavity within the structure of housing 14, when halves 15, 16 are brought into superposed positions, with walls 19, 20, 25, 24 of half 15 brought into alignment atop walls 19, 20, 24, 25 of half 16. For convenience of manufacture, halves 15, 16 may be identical parts made, for example, of cast aluminum.

Figure 2:
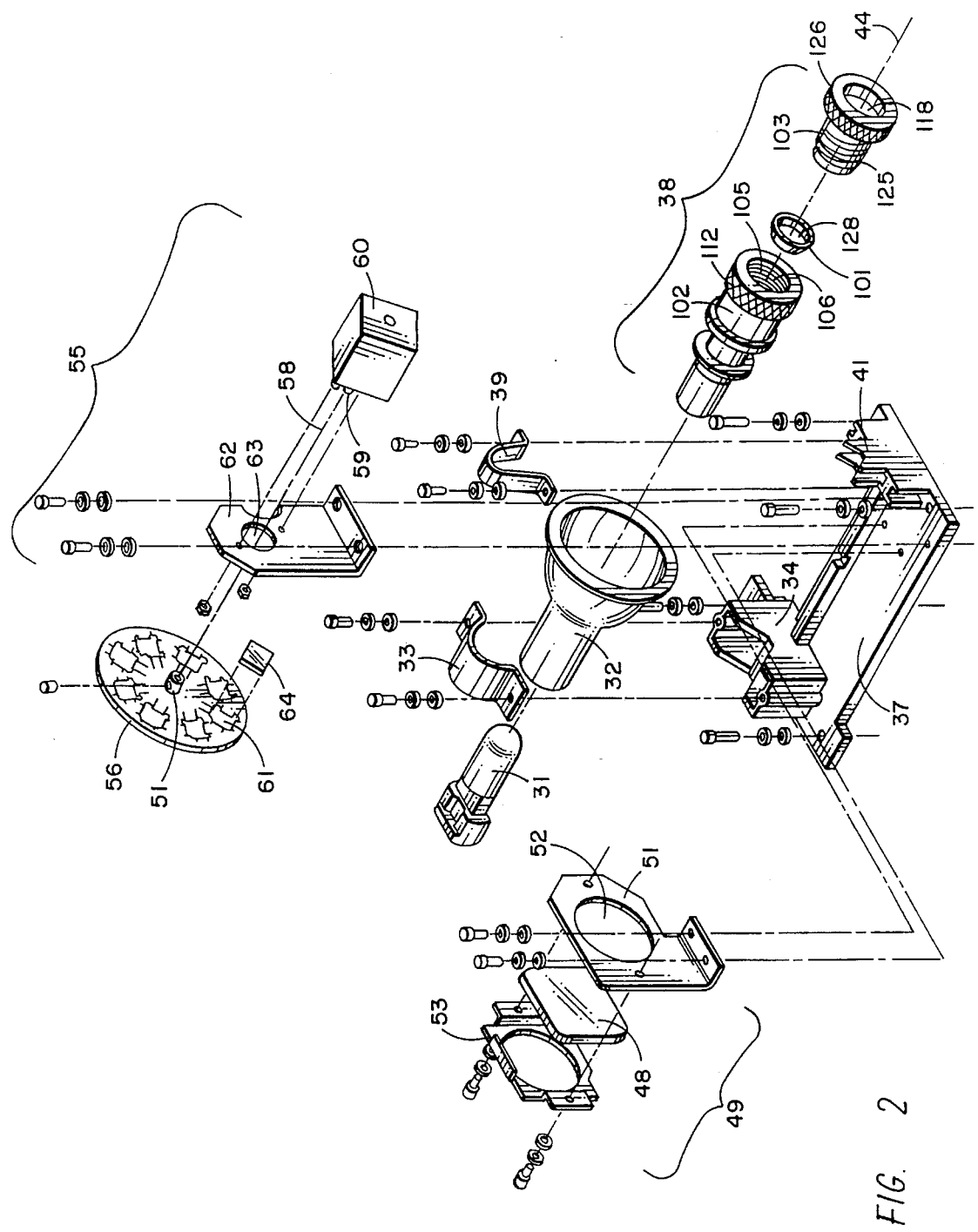
FIG. 2 is an exploded view showing components of the optical assembly of the light source apparatus of FIG. 1.

Housing 14 serves as a protective enclosure for components of an optical system 30, shown in FIGS. 1 and 2. System 30 comprises a high intensity, gas discharge lamp 31 positioned within a reflector 32 and mounted by means of a first clamp 33 atop a first V-block 34 of an optical bench 37. A ferrule 38 is mounted by means of a second clamp 39 atop a second V-block 41 of the same bench 37. Bench 37 is mounted on base 22 within cavity portion 26b of housing bottom half 16, with V-blocks 34, 41 located in longitudinally spaced positions for alignment of bulb 31, reflector 32 and ferrule 38 along an optical axis 44, with ferrule 38 extending through an aperture 45 located in the front of housing 14. Aperture 45 is formed by upper and lower arcs 46a, 46b which are respectively formed on front walls 19 of housing halves 15, 16, and which are brought into opposing positions when halves 15, 16 are brought together to close the internal cavity of housing 14.

Optical system 30 also includes a plate of heat absorbing glass 48 which is mounted generally orthogal to axis 44, between reflector 32 and ferrule 38 on bench 37 by means of a bracket assembly 49. Assembly 49 may comprise a vertically extending, planar support 51 having an aperture 52 over which plate 48 is held by means of a marginal clamp 53; or may, alternatively, have a unitary construction comprising a single apertured support member including marginal bends defining a pocket into which plate 48 can be received.

A color wheel assembly 55 (FIG. 2) includes a color wheel in the form of a disk 56 having a central hub 57 mounted for rotation about a rotary axis 58 on a drive shaft 59 of a stepper motor 60. A plurality of apertures 61 are formed at angularly spaced intervals, circumferentially about disk 56. Motor 60 is mounted on bench 37 to one side of axis 44 by means of a bracket 62. Shaft 59 extends through a bracket opening 63 and positions disk 56 between plate 48 and ferrule 38, generally orthogonal to axis 44. A different color dichroic glass filter 64 is associated with each aperture 61, and disk 56 is dimensioned, configured and adapted so that different positions of stepper motor shaft 59 will bring different ones of the color filters 64a into alignment with axis 44. A notch 66 in bracket 62 serves to avoid obstruction by bracket 62 of the beam from lamp 31 passing through a selected filter aperture 61. Power for lamp 31 and motor 60 (viz. transformer, ballast, etc.) is supplied through electrical connection with a power supply 68, mounted on base 22 toward the rear of cavity portion 46b. Positioning control for stepper motor 60 is provided by electrical connection to a control circuit 69 housed in the same general vicinity (see FIG. 1). A position sensor 70 is located adjacent the outer edge of disk 56 to provide a "zero" angular positional reference for stepper control.

Figure 4:
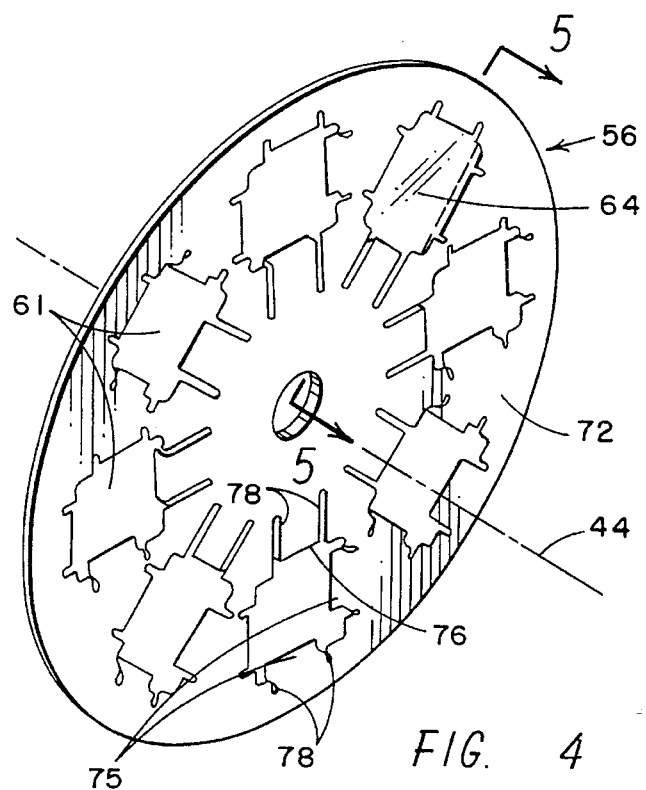
FIG. 4 is a front perspective view of the color wheel element of FIGS. 1 and 2.
Figure 5:
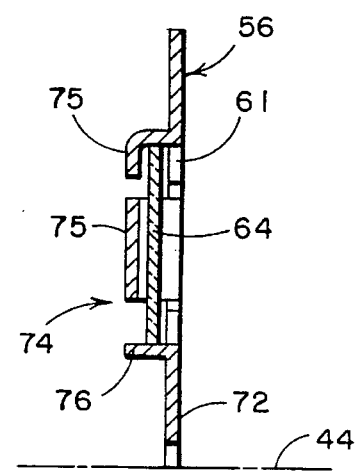
FIG. 5 is a fragmentary section view, taken along the line 5—5 of FIG. 4.

Details of one embodiment of color wheel disk 56 are shown in FIGS. 4 and 5. As illustrated there, a unitary circular main body 72 has eight rectangular apertures 61 formed therein at 45° equiangular spacings, with peripheral edges bent (e.g., by metal stamping) to provide spring-loaded pockets 74 into which filters 64 can be inserted. Each aperture 61 is bordered at its radial and outer edges by a normal, then parallel to the disk directed L-shaped tab 75 (FIG. 5) and at its inner edge by a normal to the disk directed tab 76. The normal directed tab portions provide platforms against which corresponding edges of a filter 64 can be rested. The parallel directed portions act as stops. The aperture edges have slits 78 on either side of the tabs 75, 76 to cause the tabs to yield resiliently for placement and retention of the filters 64. It is advantageous for stepper performance to space the apertures 61 at equal angles about the center of disk 56; however, it may be desirable to leave one designated aperture area 79 (FIG. 1) uncut, to serve as a shutter for blocking light from reaching the cable.

Figure 6:
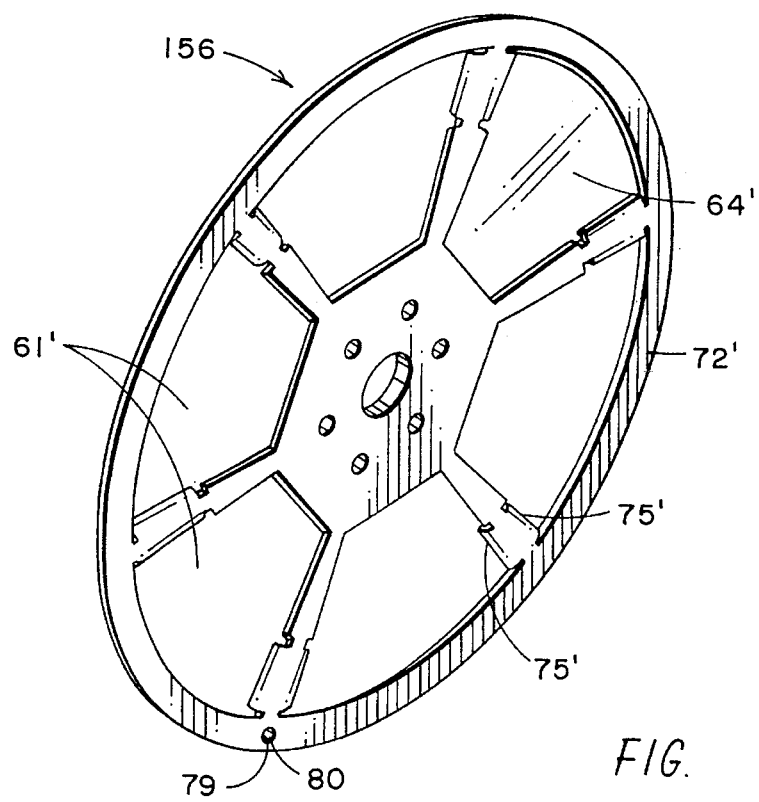
FIG. 6 is a view, as in FIG. 4, of an a modified form of the color wheel element.

FIG. 6 illustrates a modified color wheel disk 56' having a main body 72' of 26-gauge or similar aluminum stamped metal, and formed with six larger apertures 61' of generally trapezoidal shape for accommodating correspondingly trapezoidal shaped filters 64'. Like disk 56, disk 56' is provided with bent radial edge tabs 75' and slits 78' to provide spring-action framing for holding the filters in place. Disk 56' is cut to also provide a raised index tab 79 and associated opening 80 peripherally of its outer circumference. Depending on the type of sensor 70 (FIG. 1) employed, either of these can be used to indicate a known reference "zero"

angular position of disk 56'. The projection of tab 79 above the disk surface can be detected, for example, by a mechanical or visual sensor; or, alternatively, an LED or other light source directed at the disk periphery can be viewed through opening 80 detected by an optical sensor.

Cooling for optical system 30 is provided by drawing air through the front of the housing internal cavity, from vent openings 84 located on one side of housing 14 to vent openings 85 located on the other side of housing 14, across optical bench 37. The front of reflector 32 is left open and spacing is provided between reflector 32 and plate 48, between plate 48 and disk 56, and between disk 56 and ferrule 38, to provide gaps through which the generally orthogonally directed air can flow.

Figure 3:
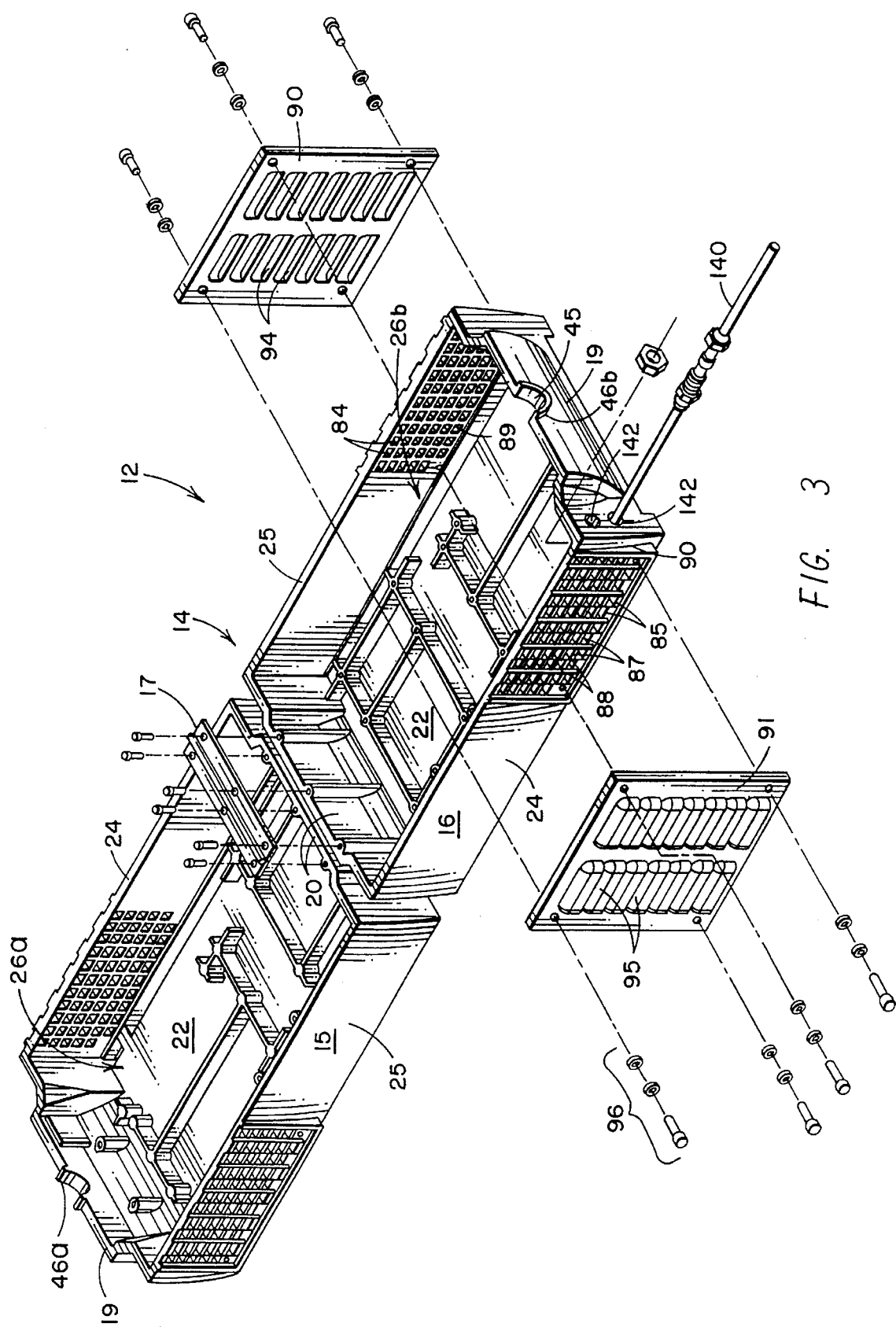
FIG. 3 is an exploded view showing the clamshell housing construction and rotational lover design of the same light source.

As shown in FIGS. 1 and 3, each housing half 15, 16 includes a half-square grillwork of heat conductive fins 87 and cross-fins 88 defining laterally directed air channels 89 for passing the air. The half-squares of top half 15 mate with the corresponding half-squares of bottom half 16 when the clamshell structure of housing 14 is closed about hinge 17, providing aligned opposing square matrix arrays of channels 89 having an external square lip 90 into which identical square louver panels 91, 92 are fastened, as indicated in FIG. 3. Each panel 91, 92 includes a series of openings 94 all shielded by skirts or awnings 95 to direct flow to or from a same one direction (the down direction in FIG. 3) parallel to the plane of the panel. Panels 91, 92 are symmetrical about horizontal and vertical centers and secured at their corners within lips 90 by removable fasteners 96, so that they may be attached over the channels 89 in any selected one of four angular orientations, each rotated 90° from the other about the panel center and in the panel plane. Thus, panels 91, 92 not only serve as means for holding the top and bottom halves 15, 16 in their superposed cavity-closed positions, but provide selective directional shielding that can be oriented, as desired, to best protect the housing interior from rain, backsplash and the like.

Figure 7:
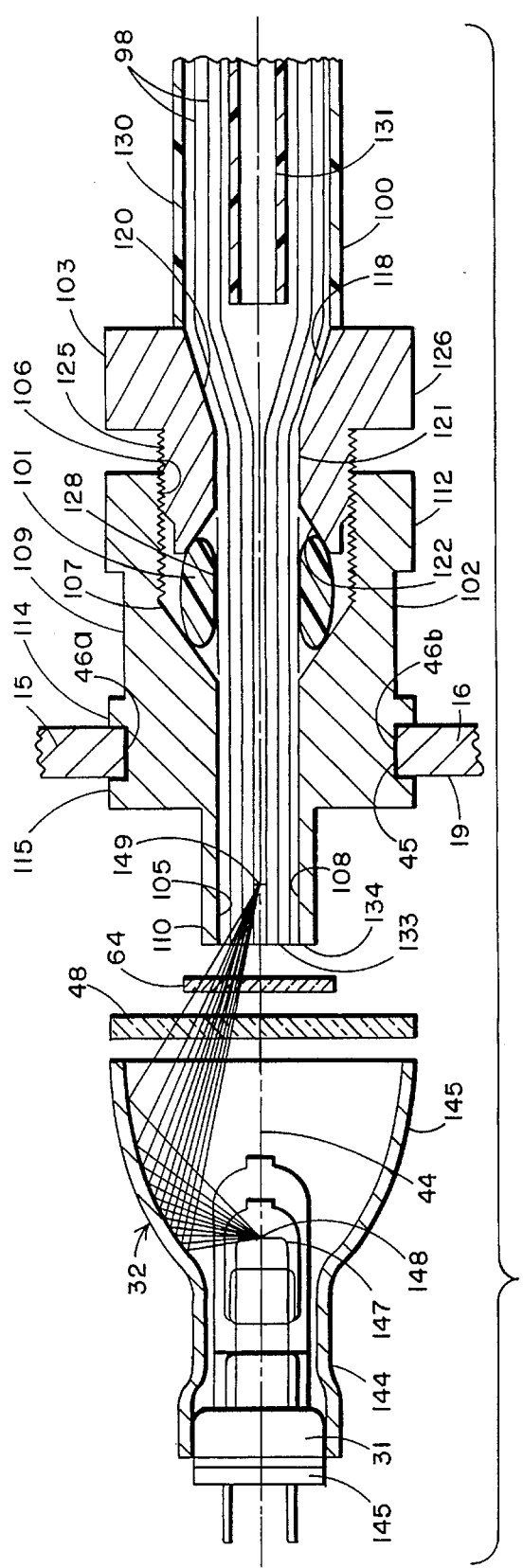
FIG. 7 is a longitudinal section view of the lamp and fiber coupling elements of the assembly of FIG. 2.

As illustrated in FIG. 7, ferrule 38 serves to couple the ends of fibers 98 of a fiber optic cable 100 within housing 14 to receive illumination from lamp 31 and reflector 32. Ferrule 38 is of simple construction including a compressible collar in the form of a grommet or stopper 101, and first and second parts in the form of tubular sections 102, 103 that can be interengaged about the grommet to capture the fibers with in ferrule 38.

Section 102 of an exemplary ferrule 38 (see FIGS. 1, 2 and 7) has a central bore 105 with a threaded uniform larger diameter front portion 106, a continuously rearwardly and inwardly tapered intermediate portion 107, and a smooth uniform smaller diameter rear portion 108. Section 102 has a stepped outside contour with a generally uniform larger diameter front portion 109 and a reduced, second uniform smaller diameter rear portion 110. The foremost part of front portion 109 is slightly enlarged and provided with a knurled, hand-grippable outer surface 112. The rear part of front portion 109 is provided with two flanges 114, 115 which are longitudinally spaced by an interval to match the longitudinal direction thickness of walls 19 of housing halves 15, 16 at arcs 46a, 46b. The outside diameter of front portion 109 in the interval between flanges 114,115 is chosen to match the inside diameter of aperture 45 formed by the joined arcs 46a, 46b. The outside diameter of rear portion 110 is chosen to cooperate with the size and position of V-notches of front V-block 41 of bench 37 so that positioning section 102 within aperture 45, with flanges 114, 115 abutting opposite faces of walls 19 of joined halves 15 and rear portion 110 resting in the V-notches of V-block 41, will align section 102 longitudinally of housing 14, with bore 105 coincident with optical axis 44.

Section 103 has a central bore 118 with a continuously rearwardly and inwardly tapered front portion 120, a smooth uniform diameter intermediate portion 121, and a continuously rearwardly and outwardly tapered rear portion 122 which automatically self-centers the fiber optical cable in the ferrule. Section 103 has a stepped outside contour with a threaded uniform diameter rear portion 125 and an enlarged front portion 126 which is provided with a knurled, hand-grippable outer surface. The outside diameter and threading of rear portion 125 of section 103 is chosen to match and be threadingly engageable with the inside diameter and threading of front portion 106 of bore 118 of section 102. The inside diameter of intermediate portion 121 may be chosen the same as, or greater than, the inside diameter of rear portion 108 of bore 105 of section 102. Grommet 101 is provided with a central opening 128, which may be about the same as, or slightly larger than, the matching diameters of rear portion 108 and intermediate portion 121. Grommet 101 may have a continuously varying, increasing then decreasing outside diameter, with a greatest dimension less than the inside diameter of front portion 106 of bore 105. Grommet 101 can be eliminated by slotting intermediate portion 121 so that portion 121 compresses around cable 100 as section 103 is threaded into section 102.

In operation for coupling a fiber optic cable (which may be of any type, but for purposes of illustration, is taken to be a type such as described in Kingstone U.S. Pat. No. 5,333,228), a portion of outside sheath 130 and inside tubing 131 of cable 100 is stripped away, exposing free lengths of fibers or fiber bundles 98 (hereafter "fibers"). Fibers 98 are passed through bore 118 of ferrule section 103, through opening 128 of grommet 101, and into bore 105 of ferrule section 102, so that the ends 133 of fibers 98 are flush with and fill the exit opening 134 of bore 105. Section 102 is placed through arc 46b of bottom housing half 16 and secured with clamp 39 within V-block 41. Sections 102 and 103 are threaded together, to compress grommet 101 between the oppositely tapered bore portions 107, 122 and about the fibers 98. The sequence of insertion and threading steps may vary to suit individual preference. Once cable 100 is secured, with fiber ends 133 in desired position relative to exit port 134, housing 14 may be closed and arc 46a brought into opposing relationship to arc 46b, about section 102. Louver panels 90, 91 may then be oriented as desired and fastened over the square matrix arrays of air venting channels 89 formed by superposed housing halves 15, 16. Other mechanisms (not shown) may also be employed to lock the two halves 15, 16 in their housing closed positions.

Ferrule 98 may be provided with different sized inside diameter bore portions 108 to accommodate different sized fibers or different numbers of fibers. Alternatively, ferrule 98 may be provided with one or more tubular adapter sleeves (not shown), having outside diameters matching the inside diameter of bore portion 108 and inside diameters chosen to match the outside diameters of different bundle sizes of fibers 98 of different sizes or types of cables 100. Also, whether and at what point an outer sheath (e.g., sheath 130) or non-fiber internal member (e.g., tubing 131) is cut back to expose the free fibers 98 may vary with individual installer preferences and types and sizes of cable. It is noted, too, that a usual way to connect power and/or control lines to a fiber optic light source is by an electrical wiring cable or conduit 140 (see FIG. 3) that is separate from the fiber optic cable; however, as disclosed in the '228 patent, the hollow of tube 131 of a cable 100 of the '228 patent type may optionally be used to carry wiring to or from a remote location within the cable itself. Thus, for example, a cable 100 illuminated by light sources at both ends may have power and control wiring to a first end light source delivered in the usual way by a conduit 140, but power and control wiring delivered to a second end light source through a conduit path provided by the hollow of tubing 131. For this reason, to give flexibility for various installation setups, housing 14 is provided with wiring pass-throughs 142 on the front of housing 14, in proximity to the cable entrance point 45. One or more pass-through openings can be provided on the wall 19 of each half 15, 16. Punch-out disks or other removable plugs may optionally be used to close off unused ones of the openings.

Figure 8:
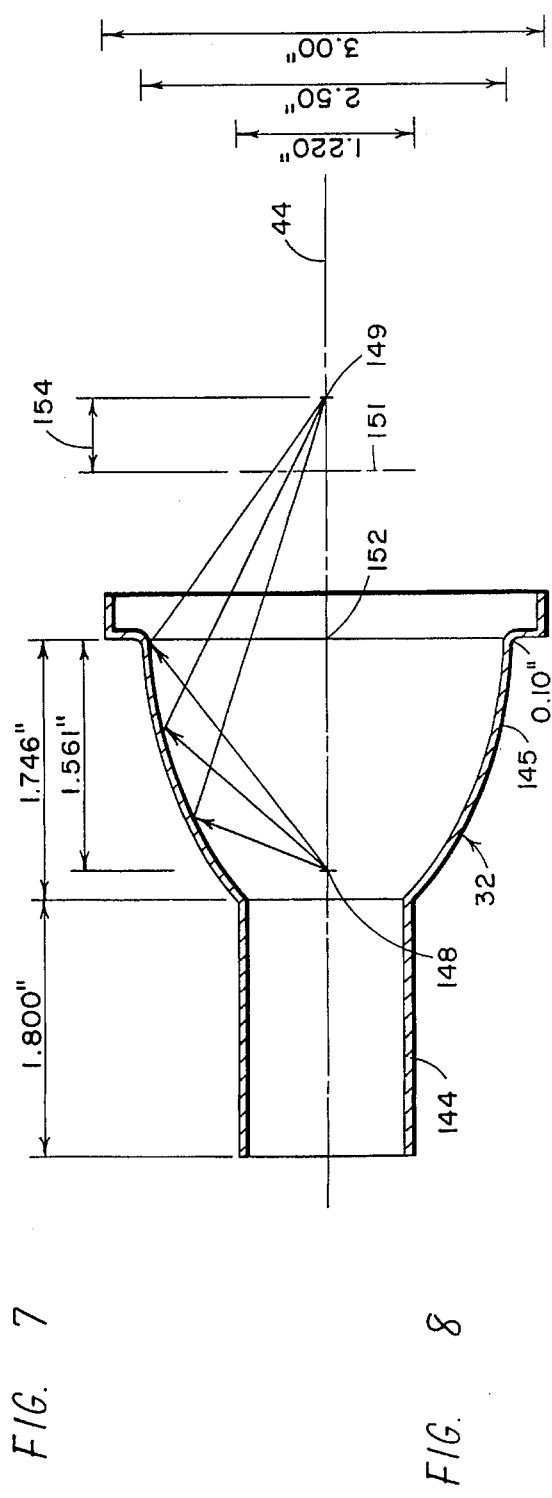
FIG. 8 is a schematic view helpful in understanding the light coupling arrangement in accordance with the invention.

Lamp 31 may be a commercially available high intensity, gas discharge lamp such as a Thorn ArcStream 4000 metal halide lamp. As shown in FIGS. 7 and 8, reflector 32 is formed with a hollow cylindrical rear section 144 adapted to receive the base 145 of lamp 31 in axial alignment with optical axis 44. A front section 145 of reflector 32 has a generally truncated ellipsoidal shape. Both sections 144, 145 are formed rotationally symmetrical about an axis coincident with optical axis 44. Lamp 31 is positioned so that its electrode discharge 147 will be centered at a proximal focal point 148 of the ellipsoidal reflection surface of section 145. This will focus the light emitted by lamp 31 toward a distal focal point 149, spaced from focal point 148 by a given distance determined by well-known mathematical relationships. In a preferred mode of operation, ferrule 38 is positioned relative to reflector 32 so that exit point 134 will be located relative to focal point 149 by an amount 154 sufficient to place the fiber ends 133 at a defocused plane 151 rearward of point 149, between point 149 and the center 152 of the ellipse. Preferred positioning places the ends 133 at a distance from point 149 to bring the diameter of the spot size of the defocused beam at plane 151 equal to or slightly larger (viz. within 25%) of the width of the fiber end bundle. For a standard bundle of fibers 98 having 14 bundles of 7 fibers of 0.750 mm diameter each, a ±2 mm (±2–3 fiber diameters) axial positioning variance was found acceptable. Dimensions for one implementation of a reflector 32 are given in FIG. 8. Suitable reflectors include a plain aluminum reflector machined by a spinning tool and later metalized; a glass reflector coated with a reflective material; and a cast aluminum reflector including built-in heat sink fins and mounting holes.

Figure 9:
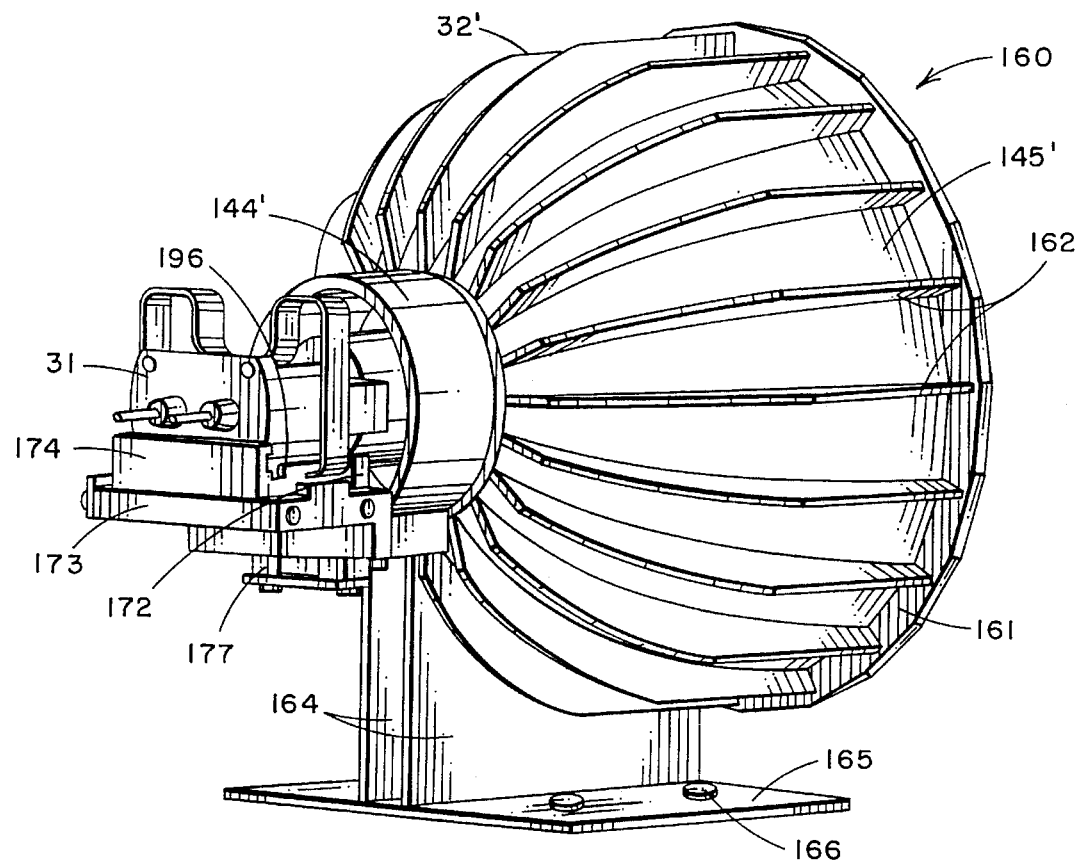
FIG. 9 is a rear perspective view showing another embodiment of the reflector element of the apparatus.
Figure 10:
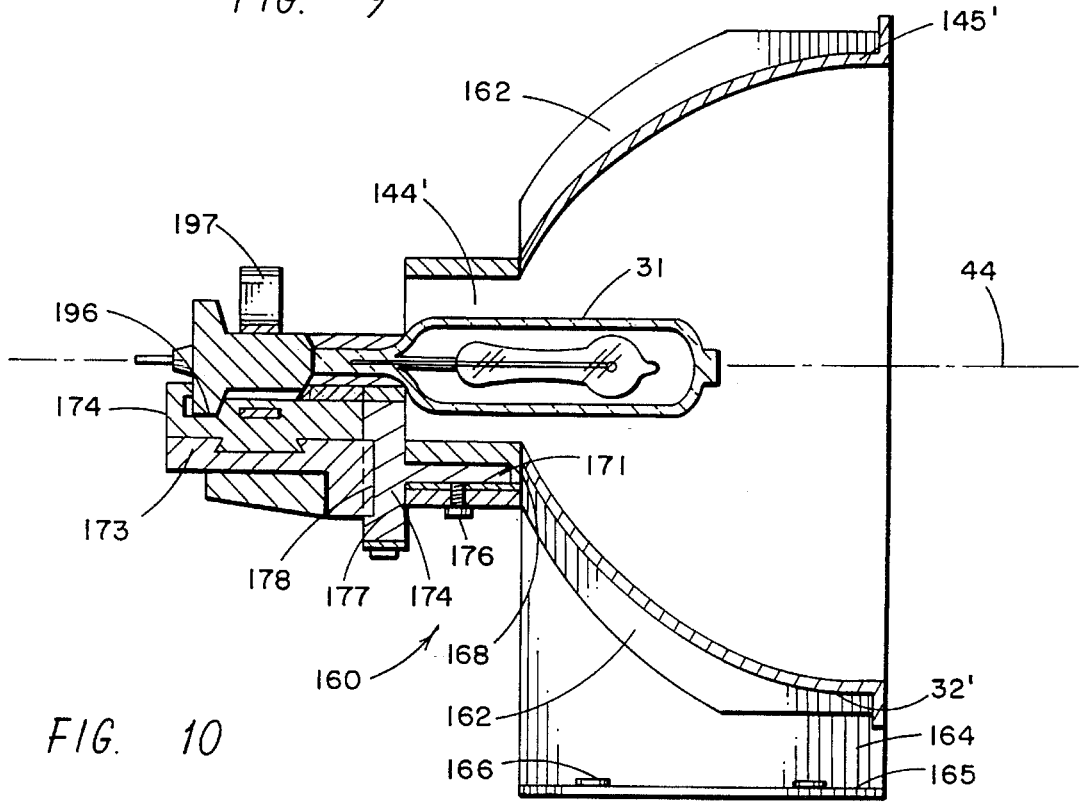
FIG. 10 is a vertical section view, taken along the line 9—9 of FIG. 9.
Figure 11:
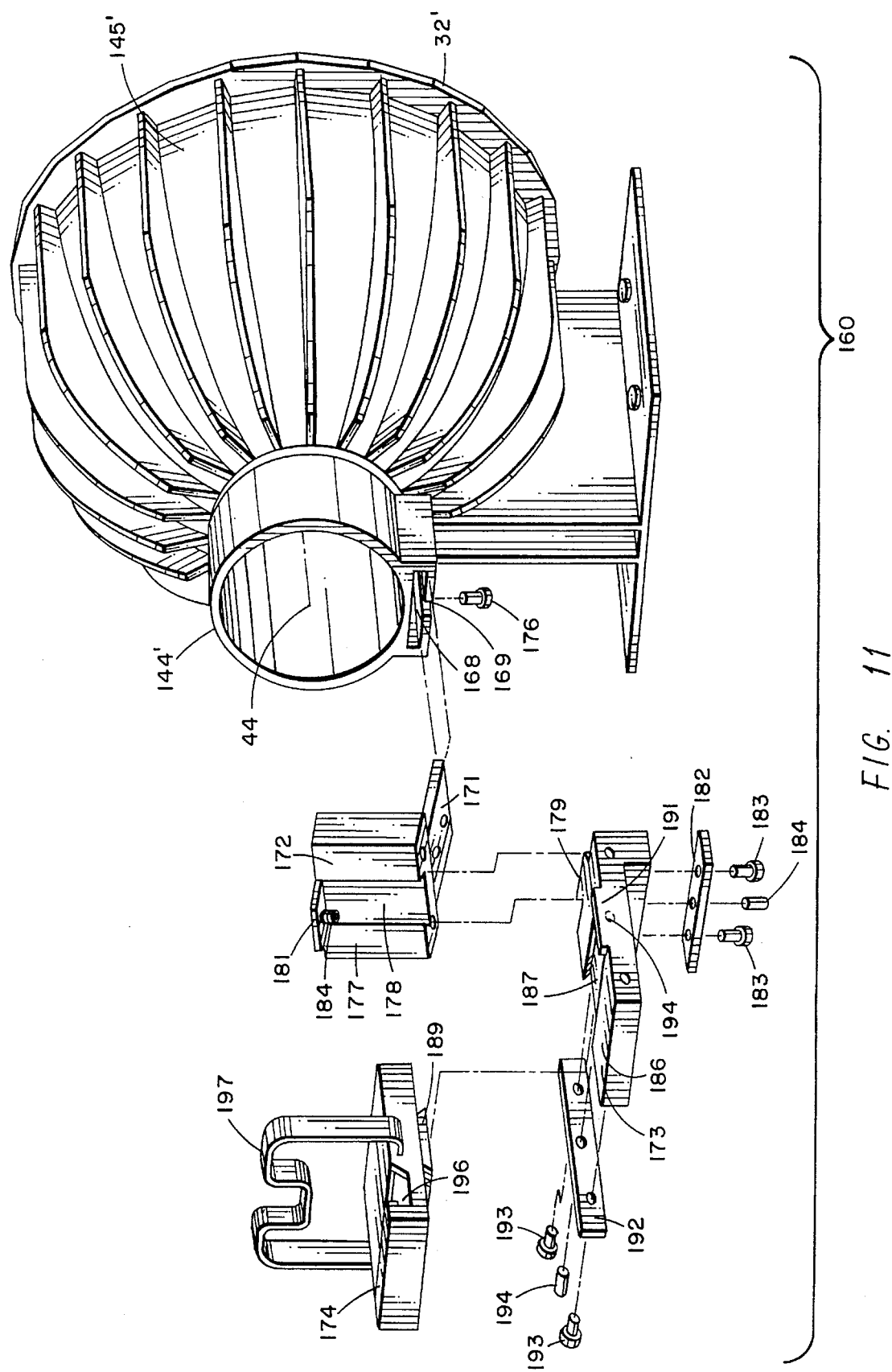
FIG. 11 is an exploded view, showing the components of the reflector embodiment of FIGS. 9 and 10.

An example of the latter kind of reflector is given in FIGS. 9–11 which show a reflector assembly 160. As before, reflector 32' includes a section 145' having a generally truncated ellipsoid internal reflecting surface. The exterior of section 145' includes, as before, a front radially extending circumferential flange 161. In addition, however, section 145' now also has a series of spaced, axially extending heat dissipating fins 162, which assist in the air cooling process, described above. Furthermore, a pair of vertical, laterally spaced legs 164 extend from the underside of section 145' to a horizontal base 165 that may be mounted by fastening means 166 to optical bench 37. Likewise, as with previous embodiments, reflector 32' includes a cylindrical rear section 144' having a hollow into which lamp 31 is inserted. In departure from prior embodiments, however, section 144' is configured to cooperate with additional elements enabling x-, y- and z- direction positional adjustments between lamp 31 and reflector 32'.

The underside of section 144' includes a rearwardly open slot 168 aligned with the reflector axis (and, thus, the optical axis 44). A slit 169 runs centrally along the bottom of slot 168. Mounted within slot 168 is a longitudinal tab 171 of a first of three nested lamp x-, z- and y- direction adjustment lamp-mounting components 172, 173, 174. Tab 171 of x-direction adjustment component 172 is movable within slot 168 to vary the x-directional positioning of all three nested components 172, 173 and 174 relative to reflector section 144'. A releasable locking screw 176 passed through slit 169 into threaded engagement with tab 171 serves to lock the x-direction position after adjustment. Component 172 has a vertically extending planar rear portion 177 including a vertically extending, dovetail cross-sectioned slot 178 into which a complementary vertically extending, dovetail cross-sectioned tab 179 of z-direction adjustment component 173 is inserted. Tab 179 of component 173 is movable within slot 178 to vary the z-directional positioning of the nested components 173, 174 relative to component 172 (and, thus, relative to reflector section 144'). The top of slot 178 is closed by an integral stop 181. After placement of tab 179 within slot 178, the bottom of slot 178 is closed with a laterally extending horizontal plate 182 which fastens to the base of component 173 by screws 183. A spring 184 is positioned in a recess on the undersurface of stop 181, and a z-direction adjustment screw 184 threaded centrally through plate 182 into abutment with the bottom of tab 179, serves to lock the position of tab 179 upwardly against the downward bias of spring 184. Component 173 has a horizontally extending planar rear portion 186 including a horizontally extending, dovetail cross-sectioned slot 187 into which a complementary horizontally extending, dovetail cross-sectioned tab 189 of y-direction adjustment component 174 is inserted. Tab 189 of component 174 is movable within slot 187 to vary the y-directional positioning of component 174 relative to component 173 (and, thus, relative to component 172 and reflector section 144'). One end of slot 187 is closed by an integral stop 191. After placement of tab 189 within slot 187, the other end of slot 187 is closed with a longitudinally extending vertical plate 192 which fastens to the side of component 173 by screws 193. A spring 194 is positioned in a recess on the inside surface of stop 191, and a y-direction adjustment screw 194 threaded centrally through plate 192 into abutment with the adjacent side of tab 189, serves to lock the position of tab 189 upwardly against the opposing bias of spring 194. Component 174 is configured with a lateral recess 196 dimensioned and configured to receive a corresponding enlargement of the base of lamp 31. The remainder of the upper surface of component 174 is contoured to match the abutting contour of lamp 31, and a spring clamp 197 is provided to serve as a hold-down to hold lamp 31 in fixed position for x-, y- and z-adjustment according to positioning set for component 174. Components 172, 173 and 174 serve to suitably adjust the lamp 31 to give maximum discharge at the proximal focal point 148 of the ellipsoid reflection surface. Once desired positioning is established a, preferably subsequently removable, locking material is applied to set the adjustment screw positions.

Those skilled in the art to which the invention relates will appreciate that other substitutions and modifications can be made to the described embodiments, without departing from the spirit and scope of the invention as defined by the claims below.

What is claimed is:

1. A light source for illuminating a fiber optic cable, comprising:
   a housing;
   an optical system located within said housing; said optical system comprising a reflector and a high intensity lamp positioned within said reflector for directing light along an optical axis; and a ferrule for coupling ends of fibers of a fiber optic cable along said optical axis to receive illumination from said lamp and reflector; said ferrule automatically self-centering said cable on said optical axis and comprising a first ferrule section having an externally threaded compressible collar through which the fibers can be passed and a second internally threaded ferrule section that threadedly engages the threaded collar and compresses the collar around the fibers to capture the fibers within the ferrule.

2. The light source of claim 1, wherein said optical system comprises an optical bench having first and second V-blocks aligned along said optical axis; said reflector and lamp are mounted on said first V-block; and said ferrule is mounted on said second V-block.

3. The light source of claim 1 wherein said optical system further comprises a color wheel assembly; said color wheel assembly includes a motor, a disk mounted for rotation by said motor, and a plurality of color filters mounted on said disk; said disk has a plurality of apertures formed at angularly spaced intervals, circumferentially about said disk, with different ones of said color filters covering respective different ones of said disk apertures; and said disk is positioned so that said disk can be rotated by said motor to bring different ones of the disk apertues into alignment with said optical axis, said color wheel assembly disk having a unitary body with said disk apertures formed with peripheral edges bent to form spring-loaded pockets and said color filters mounted in respective ones of said spring-loaded pockets.

4. The light source of claim 3, wherein said motor is a stepper motor with a shaft; said disk is mounted on said motor shaft; and said optical system further comprises a control circuit for controlling stepping operation of said motor, and a position sensor located adjacent a periphery of said disk and connected to provide a disk angular positional reference to said control circuit.

5. The light source of claim 1, further comprising cooling means for cooling said optical system; said cooling means including openings located in separated positions on said housing, and louver panels mounted on said housing and covering said openings; and said louver panels including shields covering air flow channels, and being rotatable relative to said openings for selectively controlling direction of air flow through said channels.

6. The light source of claim 5, wherein said housing comprises top and bottom halves, joined in clamshell fashion about a hinge; wherein said openings are located on opposite sides of said optical axis and said optical system is arranged so that air flowing between said openings will pass between said reflector and said ferrule; and wherein said openings are formed by upper and lower opening portions respectively formed at locations on said top and bottom halves and which are brought into opposing positions to define said openings when said halves are brought together about said hinge.

7. The light source of claim 6, wherein said louver panels are secured over said openings by removable fasteners, and are symmetrical about horizontal and vertical centers, so that they may be attached over said openings in any selected one of four angular orientations, each rotated 90° from the other.

8. The light source of claim 1 in combination with the fiber optic cable having ends of fibers; wherein said reflector is an ellipsoid reflector having a proximal and a distal focus; said lamp has a lamp filament located at said proximal focus; and said fiber ends are located by said ferrule at a position spaced from said distal focus, in a defocused zone of said illumination.

9. The light source and cable combination of claim 8, wherein said ellipsoid reflector has an ellipse center; said reflector and lamp produce a beam of illumination focused at said distal focus; said fiber ends are grouped in a bundle having a width; and said fiber ends are located between said distal focus and said ellipse center at a position so that a spot size of said beam at said position will have a diameter 1–1.25 times said width of said fiber end bundle.

10. The light source of claim 1, wherein said reflector includes a front section having a generally truncated ellipsoid internal reflecting surface and an external surface with a series of spaced, axially-extending heat dissipating fins; a rear section having a hollow within which said lamp is inserted; and nested lamp mounting components for adjusting positioning of said lamp in x-, y- and z-directions relative to said reflector.

11. A light source for illuminating a fiber optic cable, comprising:

a housing having an internal cavity and an aperture communicating said cavity externally of said housing;

an optical system located within said internal cavity; said optical system comprising a reflector and a high intensity lamp positioned within said reflector for directing light along an optical axis, a plate of heat absorbing material spaced from said reflector, and at least one color filter spaced from said plate and said reflector;

means, extending through said aperture, for coupling ends of fibers of a fiber optic cable along said optical axis to receive illumination from said lamp and reflector, through said plate and color filter; and cooling means for cooling said optical system; said cooling means including openings located on opposite sides of said optical axis in positions so that air flowing between said cooling means openings will pass in said spacings between said reflector, said plate and said color filter.

12. The light source of claim 11, wherein said housing comprises top and bottom halves, joined in clamshell fashion about a hinge; and wherein said cooling means openings are formed by upper and lower opening portions respectively formed at locations on said top and bottom halves and which are brought into opposing positions to define said cooling means openings when said halves are brought together about said hinge.

13. The light source of claim 12, wherein said openings are formed with air flow channels; and said cooling means further comprises louver panels mounted on said housing and covering said cooling means openings; said louver panels including shields covering said air flow channels, and being rotatable relative to said cooling means openings for selectively controlling direction of air flow through said channels.

14. The light source of claim 13, further comprising removable fasteners securing said louver panels over said cooling means openings; and wherein said louver panels are symmetrical about horizontal and vertical centers, so that said louver panels may be attached over said cooler means openings in any selected one of four angular orientations, each rotated 90° from the other.

15. A method for illuminating a fiber optic cable, comprising:

providing an ellipsoid reflector within a housing; said reflector having a proximal focus, a distal focus and an ellipse center;

locating a filament of a high intensity lamp at said proximal focus;

passing ends of fibers through a compressible collar, and interengaging first and second sections of a ferrule about said collar to capture said fibers within said ferrule;

locating said fiber ends captured within said ferrule relative to said reflector, with said fiber ends grouped in a bundle between said distal focus and said ellipse center, so that illumination from said filament and reflector will form a spot on said fiber ends which has a spot size diameter 1–1.25 times a width of said bundle.

\* \* \* \* \*